United States Patent
Hampton et al.

(10) Patent No.: US 9,891,672 B2
(45) Date of Patent: Feb. 13, 2018

(54) INFORMATION HANDLING SYSTEM LOW PROFILE HOUSING AND HINGE ASSEMBLY

(71) Applicant: Dell Products L.P., Round Rock, TX (US)

(72) Inventors: Patrick A. Hampton, Round Rock, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/132,362

(22) Filed: Apr. 19, 2016

(65) Prior Publication Data
US 2017/0300089 A1    Oct. 19, 2017

(51) Int. Cl.
  *G06F 1/16*    (2006.01)
  *G06F 1/18*    (2006.01)
(52) U.S. Cl.
  CPC .......... *G06F 1/1681* (2013.01); *G06F 1/1662* (2013.01); *G06F 1/182* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 5,394,297 A * | 2/1995 | Toedter | ............. | G06F 1/1616 16/386 |
| 6,223,393 B1 * | 5/2001 | Knopf | ............. | G06F 1/1681 16/366 |
| 8,713,759 B2 * | 5/2014 | Cai | ............. | G06F 1/1681 16/366 |
| 8,854,834 B2 * | 10/2014 | O'Connor | ............. | G06F 1/1641 16/334 |
| 9,201,464 B2 | 12/2015 | Uchiyama et al. | | |
| 9,507,388 B1 * | 11/2016 | Hampton | ............. | G06F 1/1681 |
| 2016/0187935 A1 * | 6/2016 | Tazbaz | ............. | G06F 1/1681 361/679.03 |
| 2016/0195901 A1 * | 7/2016 | Kauhaniemi | ............. | G06F 1/1681 361/679.27 |
| 2017/0097657 A1 * | 4/2017 | Hampton | ............. | G06F 1/1616 |

OTHER PUBLICATIONS

Business Wire, New Lenovo Ultra Slim YOGA 3 Pro Adapts to Users, printed Apr. 18, 2016 http://www.businesswire.com/news/home/20141009005082/en/Lenovo-Ultra-Slim-YOGA-3-Pro-Adapts.

* cited by examiner

*Primary Examiner* — Lisa Lea Edmonds
(74) *Attorney, Agent, or Firm* — Terrile, Cannatti, Chambers & Holland, LLP; Robert W. Holland (57) ABSTRACT

A portable information handling system has a hinge assembly that rotationally couples lid and main portions with one or more communication cables passing between the lid and main portions. A flexible cover over the hinge assembly protects the cables and offers free rotational motion by stretching and compressing responsive to rotation of the lid and main portions relative to each other.

13 Claims, 12 Drawing Sheets

INFORMATION HANDLING SYSTEM LOW PROFILE HOUSING AND HINGE ASSEMBLY

BACKGROUND OF THE INVENTION

Field of the Invention

The present invention relates in general to the field of information handling system housings, and more particularly to an information handling system low profile housing and hinge assembly.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems continue to shrink in size and increase in capability. End users appreciate small portable systems that readily travel so that end users can access information on-the-go. End users tend to prefer smartphone or tablet information handling systems for accessing information that does not require extended input interactions. For example, end users access email and Internet resources through a touchscreen display that presents a keyboard to accept inputs. Touchscreen display keyboard interfaces provide a convenient input device where only minimal inputs are required, however, touchscreen display keyboard interfaces generally do not conveniently support more complex input tasks, such as word processing. Generally, end users who have to perform input intensive tasks while mobile will rely on portable information handling systems that integrate a keyboard, such as systems that have a convertible or clamshell configuration. For example, convertible and clamshell systems have a main housing portion that contains processing components and a lid housing portion that contains a display. The main and lid housing portions rotationally couple to each other with a hinge. The hinge rotates the display in the lid portion approximately 90 degrees relative to an integrated keyboard in an upper surface of the main housing portion so that the display is in a viewing position relative to the keyboard. In convertible systems, the housing portions rotate 360 degrees relative to each other so that the display is exposed for use as a tablet.

Generally, a portable information handling system's housing length and width are driven by the size of the display integrated in the lid housing portion. Although end users generally understand that system height and width are driven by the end user's display size preference, end users tend to prefer housings that are otherwise as minimal and non-intrusive as possible. In particular, end users prefer to have minimal system height so that an information handling system remains as portable as possible when closed, either for storage or for use in a tablet configuration. Minimizing height means minimizing the thickness of both the main and lid portions and also minimizing the hinge structure that supports rotation of the main portion relative to the lid portion. The hinge structure must provide sufficient robustness to withstand repeated rotational cycles of the main and lid housing portions relative to each other. The hinge structure also has to leave some room for passing communication cables between the main and lid portions, such as cables to communicate graphics information, microphone information, speaker information, RF antenna information, etc. Often, the hinge structure involves synchronization mechanisms that regulate motion of the housing portions relative to each other. Robust hinge structures with a reasonable aesthetic appearance often displace much of the space between the housing portions in an attempt to build an efficient structure that is restricted to the rotational arc of the housings relative to each other. Thus, careful routing of cables through a hinge structure is often performed in order to keep system height and hinge size to a minimum.

SUMMARY OF THE INVENTION

Therefore, a need has arisen for a system and method which provides an information handling system low profile hinge for reduced system height and improved cable routing.

In accordance with the present invention, a system and method are provided which substantially reduce the disadvantages and problems associated with previous methods and systems for rotationally coupling portable information handling system housing portions to each other. Main and lid housing portions rotationally couple with a hinge assembly having an elastic cover extending over hinge elements to protect cables that travel between the housing portions. The elastic cover stretches and compresses responsive to housing portion rotation to securely enclose cables supporting communication of information between the housing portions.

More specifically, a portable information handling system has main and lid portions rotationally coupled to each other with a hinge assembly. The main portion includes processing components for processing information, such as a CPU and RAM, and a keyboard for accepting keyed inputs. The lid portion integrates a display and other components, such as wireless antennae for supporting wireless networking. A hinge assembly rotationally couples the main and lid portions to each other with a plurality of geared synchronous hinges disposed along a rotational axis. Cables that communicate information between the main and lid housing portions pass between the hinges and are covered by a flexible material coupled to the hinge assembly, such as an elastic material the stretches and compresses responsive to hinge movement.

The present invention provides a number of important technical advantages. One example of an important technical advantage is that the size of a hinge is reduced by covering hinge components with a flexible cover that adapts to changing hinge configurations. The flexible cover attaches over the mechanical hinges structure to provide an aesthetically pleasing appearance with a variety of flexible materials available to meet desired ID appearances. Separating the mechanical hinge structure from the covering material supports direct cable routing between housing portions so that design constraints for cable routing are not driven by hinge location, operation and size. Robust hinge integration has increased flexibility to provide full synchronized movement between closed and tablet positions without complex cable routing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system having rotationally-coupled main and lid portions protects cables disposed between hinges with a flexible cover material. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
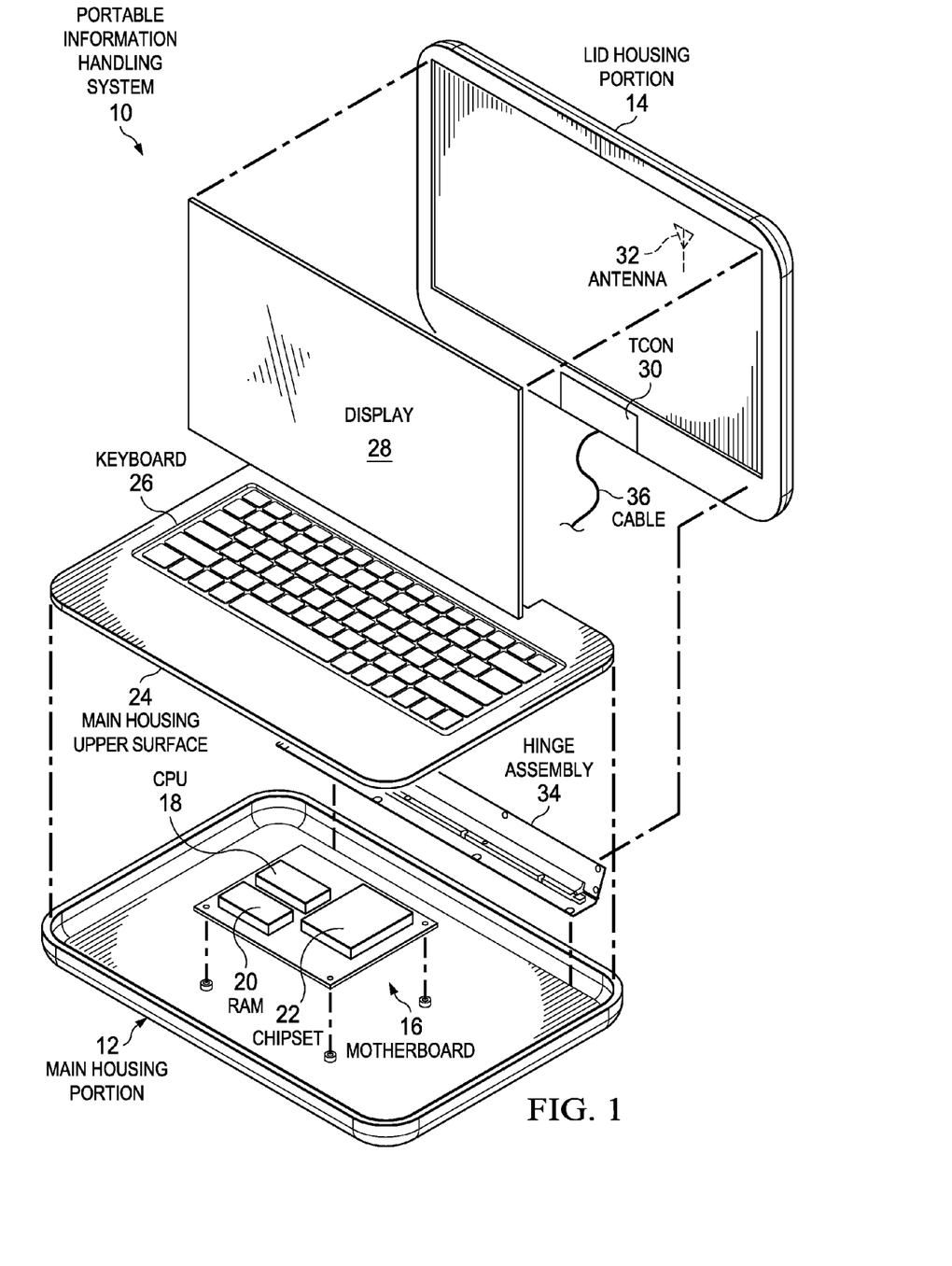
FIG. 1 depicts a blown-up view of a portable information handling system having rotationally-coupled housing portions.

Referring now to FIG. 1, a blown-up view depicts a portable information handling system 10 having rotationally-coupled housing portions. In the example embodiment, a main housing portion 12 rotationally couples to a lid housing portion 14 to support various configurations to interact with an end user. Main housing portion 12 holds processing components that cooperate to process information, such as motherboard 16 that interfaces a central processing unit (CPU) 18, random access memory (RAM) 20, and chipset 22. A main housing upper surface 24 having an integrated keyboard 26 is disposed over the processing components. Lid portion 14 integrates a display 28 that presents information as visual images. Display 28 fits over supporting components, such as a timing controller (TCON) 30 and antennae 32. A hinge assembly 34 rotationally couples main portion 12 and lid portion 14 to each other with a cable 36 providing communication of information between components disposed in main portion 12 and lid portion 14. For example, cable 36 provides communication of graphics information from a graphics processor of chipset 22 to TCON 30 for generation of visual images and provides coaxial communication of radio frequency (RF) signals from a wireless networking device of chipset 22 to antennae 32.

Hinge assembly 34 allows main housing portion 12 and lid housing portion 14 to rotate relative to each other between plural positions. When portable information handling system 10 is not in use, lid portion 14 closes over top of main portion 12 so that display 28 and keyboard 26 are protected from unintended use or damage. Rotation of lid housing portion 14 by approximately 90 degrees brings display 28 in a raised "clamshell" position relative to keyboard 26 so that an end user can make inputs to keyboard 26 while viewing display 28. The inputs are accepted at keyboard 26 by chipset 22, such as by a keyboard controller, and communicated through cable 36 for presentation at display 28. A full 360 degree rotation of main portion 12 relative to lid portion 14 provides a tablet configuration having display 28 exposed to accept touch inputs. In various embodiments, various other types of rotational relationships may be used.

Figure 2:
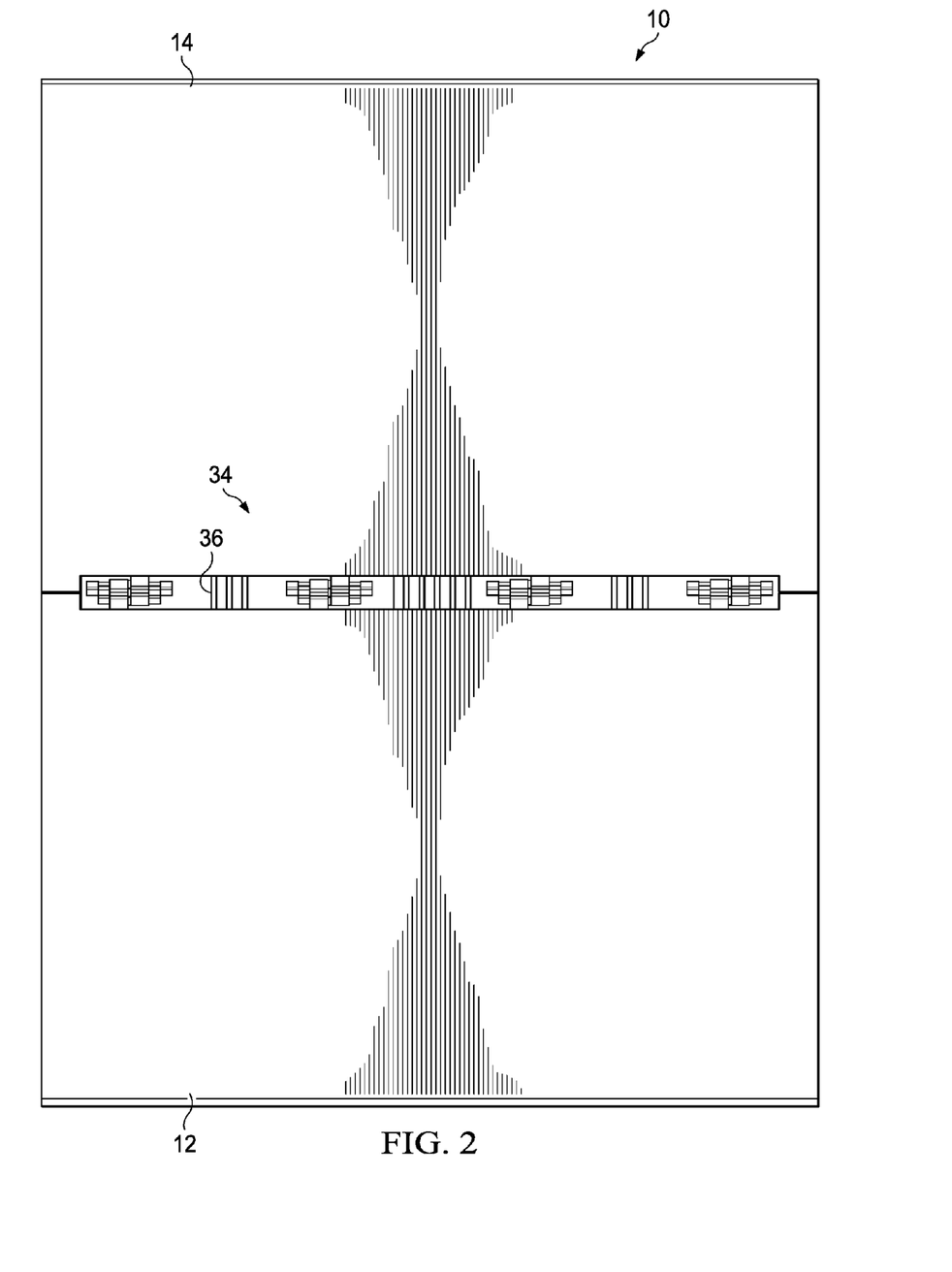
FIG. 2 depicts a top view of a portable information handling system in an open position having cables extending between the housing portions.

Referring now to FIG. 2, a top view depicts a portable information handling system 10 in an open position having cables 36 extending between the housing portions 12 and 14. In the example embodiment, main portion 12 and lid portion 14 have rotated approximately 180 degrees from a closed position to lay flat on a surface. Cables 36 extend between main housing portion 12 and lid housing portion 14 at convenient locations between openings within hinge assembly 34 largely unconstrained by the structure of hinge assembly 34. Flexible cable material of cables 36 allow free motion of main housing portion 12 relative to lid housing portion 14 with minimal if any structure to guide the cable positions.

Figure 3:
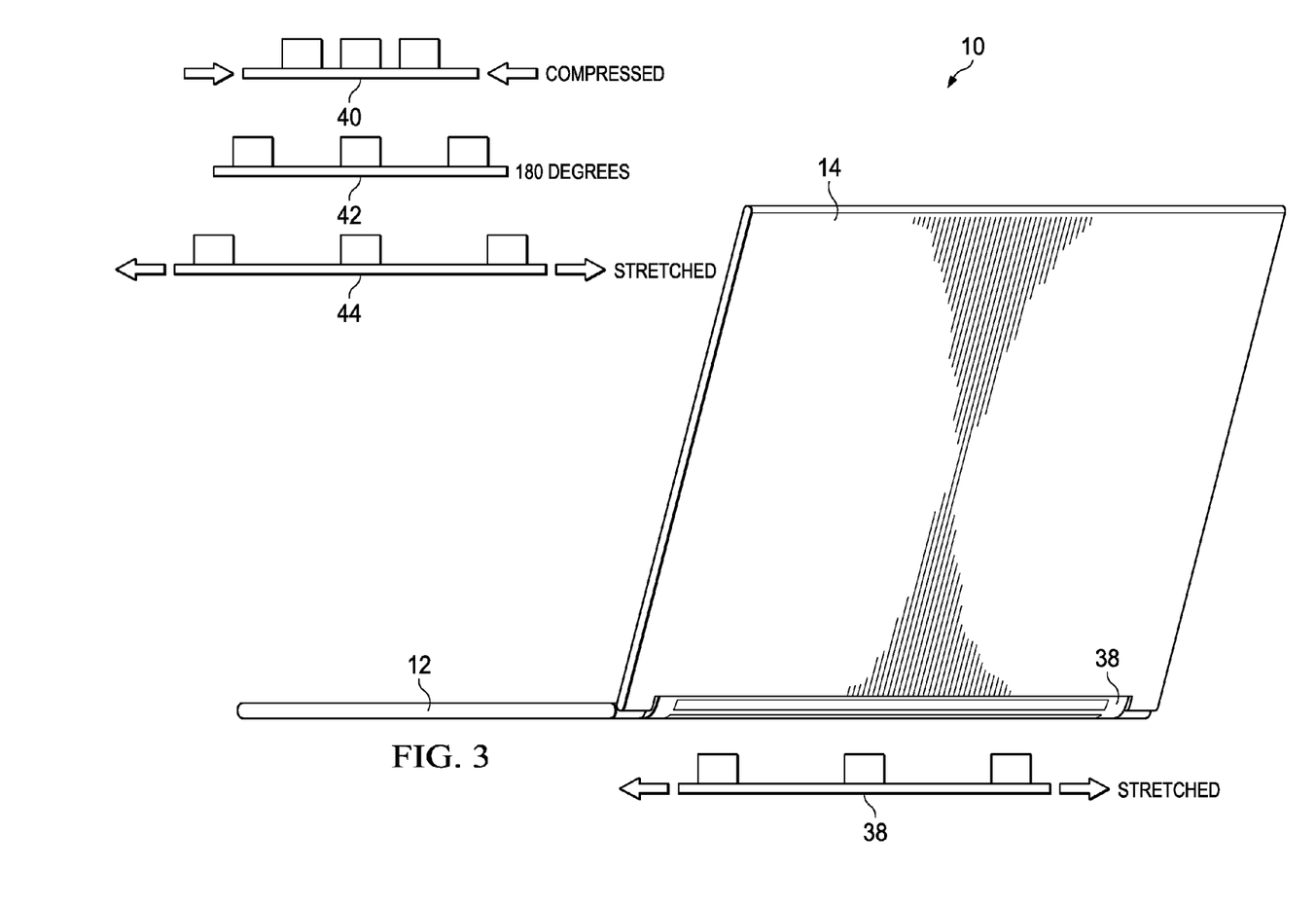
FIG. 3 depicts a rear perspective view of a portable information handling system in a clamshell open position having an elastic cover in a stretched configuration over the cables between the housing portions.
Figure 4:
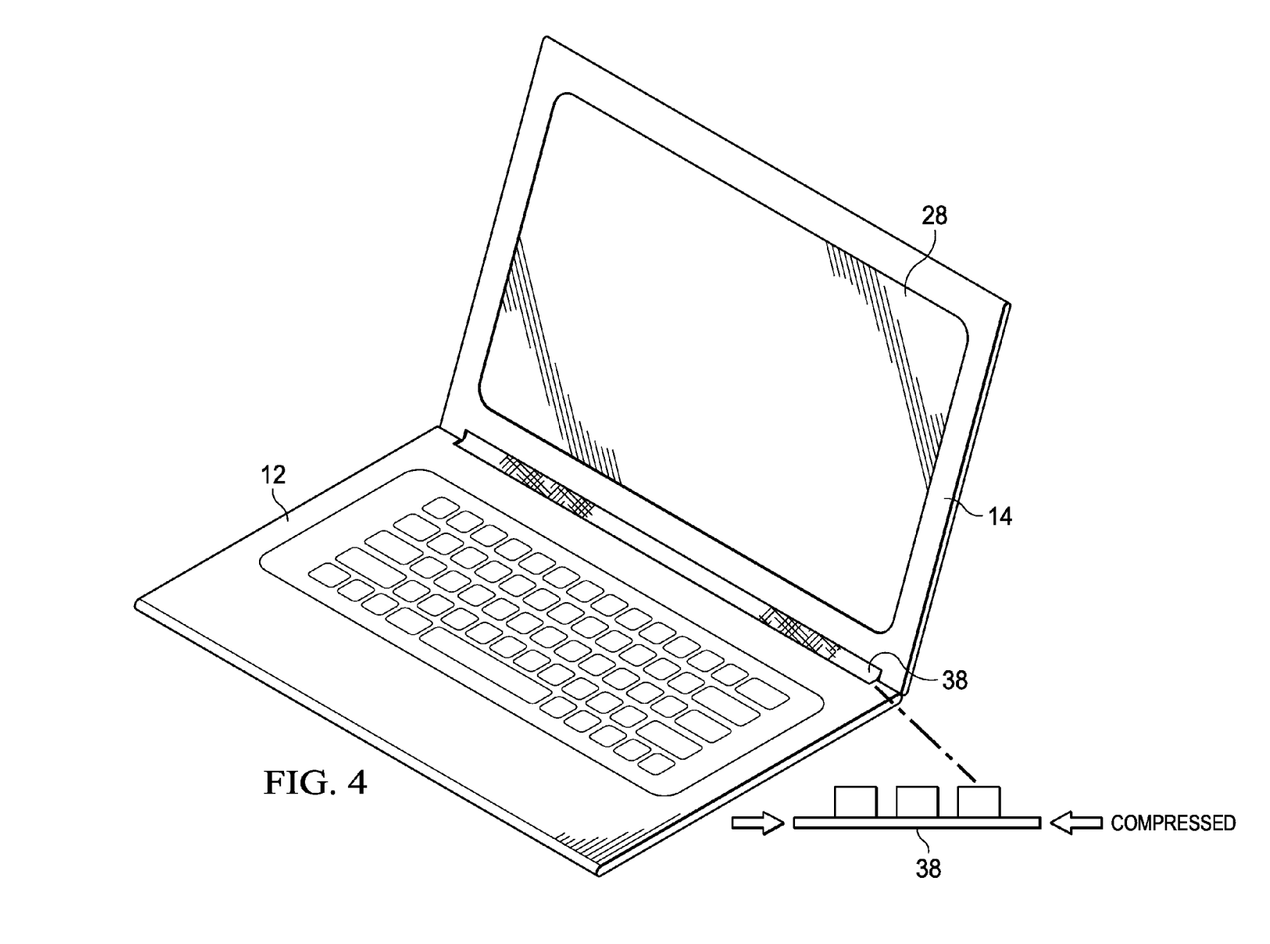
FIG. 4 depicts a front perspective view of a portable information handling system in a clamshell open position having an elastic cover in a compressed configuration.

Referring now to FIG. 3, a rear perspective view of a portable information handling system 10 in a clamshell open position depicts an elastic cover 38 in a stretched configuration over the cables 36 between the housing portions. Cover 38 stretches to a fully extended configuration as lid portion 14 closes over top of main portion 12. Cover 38 compresses to a fully compressed configuration as lid portion 14 opens to a tablet position having the rear of lid portion 14 against the bottom of main portion 12. Cover 38 has extensions of material projecting outward that help to reduce impacts from objects exterior to information handling system 10 by holding thinner portions of cover 38 distal external objects. In the example embodiment, compressed cover material 40 has extensions pressed proximate to each other. At 180 degrees of rotation, the extensions 42 have increased distance between each other, and at a fully stretched configuration 44 the distance between the extensions increases as the material stretches. FIG. 4 depicts a front perspective view of a portable information handling system in a clamshell open position having an elastic cover in a compressed configuration where the relative motion for an inner cover 38 is approximately 90 degrees as opposed to the 270 degrees of rotation experienced by the out cover 38 shown in FIG. 3.

Figure 5:
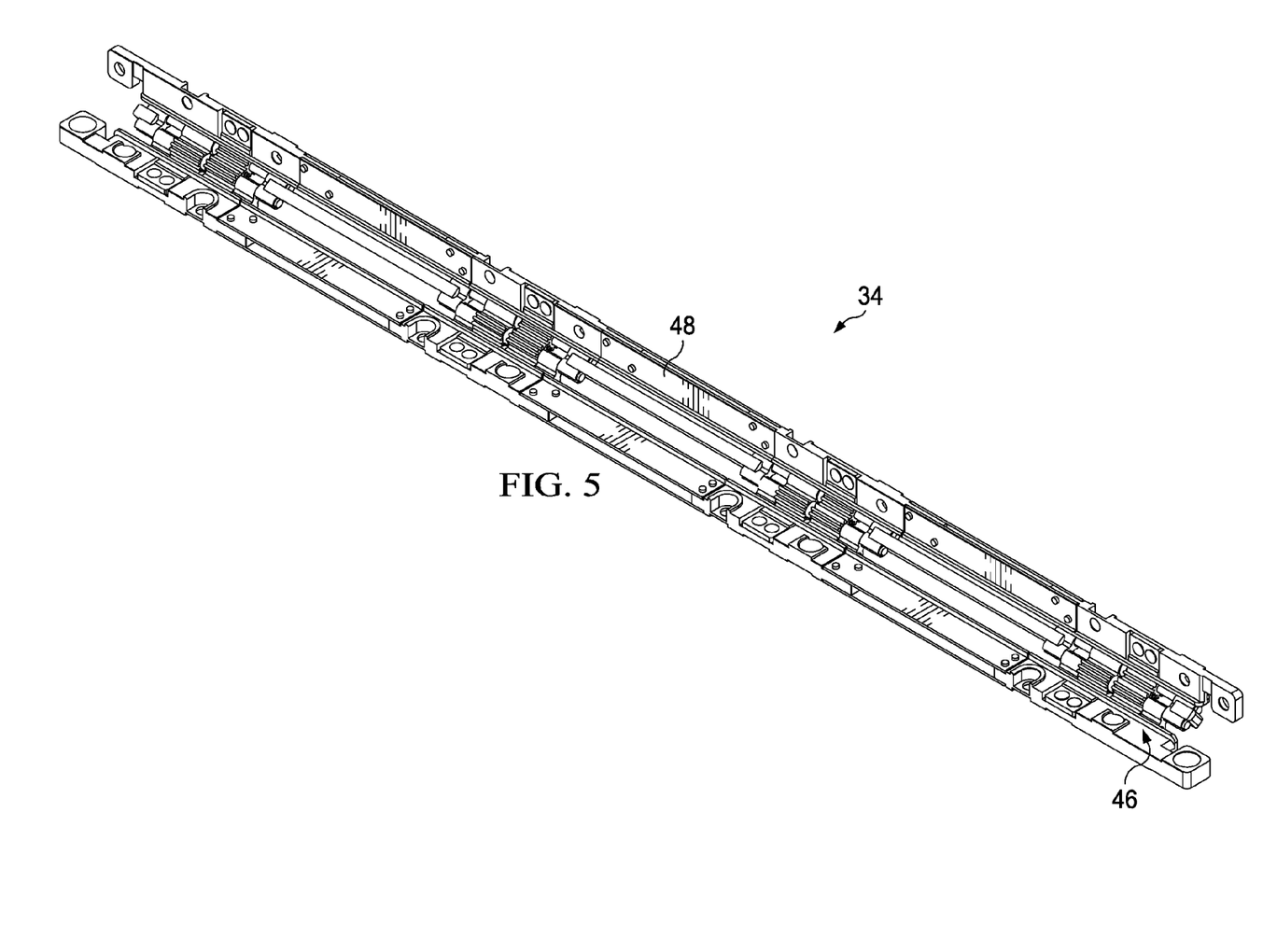
FIG. 5 depicts a side perspective view of a hinge having an adhesion surface for coupling to an elastic cover.

Referring now to FIG. 5, a side perspective view depicts a hinge assembly 34 having plural hinge elements 46 and an adhesion surface 48 for coupling to an elastic cover. In the example embodiment, each hinge element 46 has opposing gears that cooperate to provide synchronized motion of the housing portions relative to each other. Four hinge elements 46 are interconnected by an adhesion surface structure 48 that translates motion between the hinge elements 46 an provides a surface area for attaching a flexible cover 38. Although the example embodiment depicts four evenly displaced hinge elements 46, in various embodiments other relative displacements may be used as desired to interact with other components, such as cables. Uneven displacement of hinge elements 46 provides design flexibility and has minimal impact on appearance since the hinge elements 46 are covered after assembly of the housing portions to each other.

Figure 6:
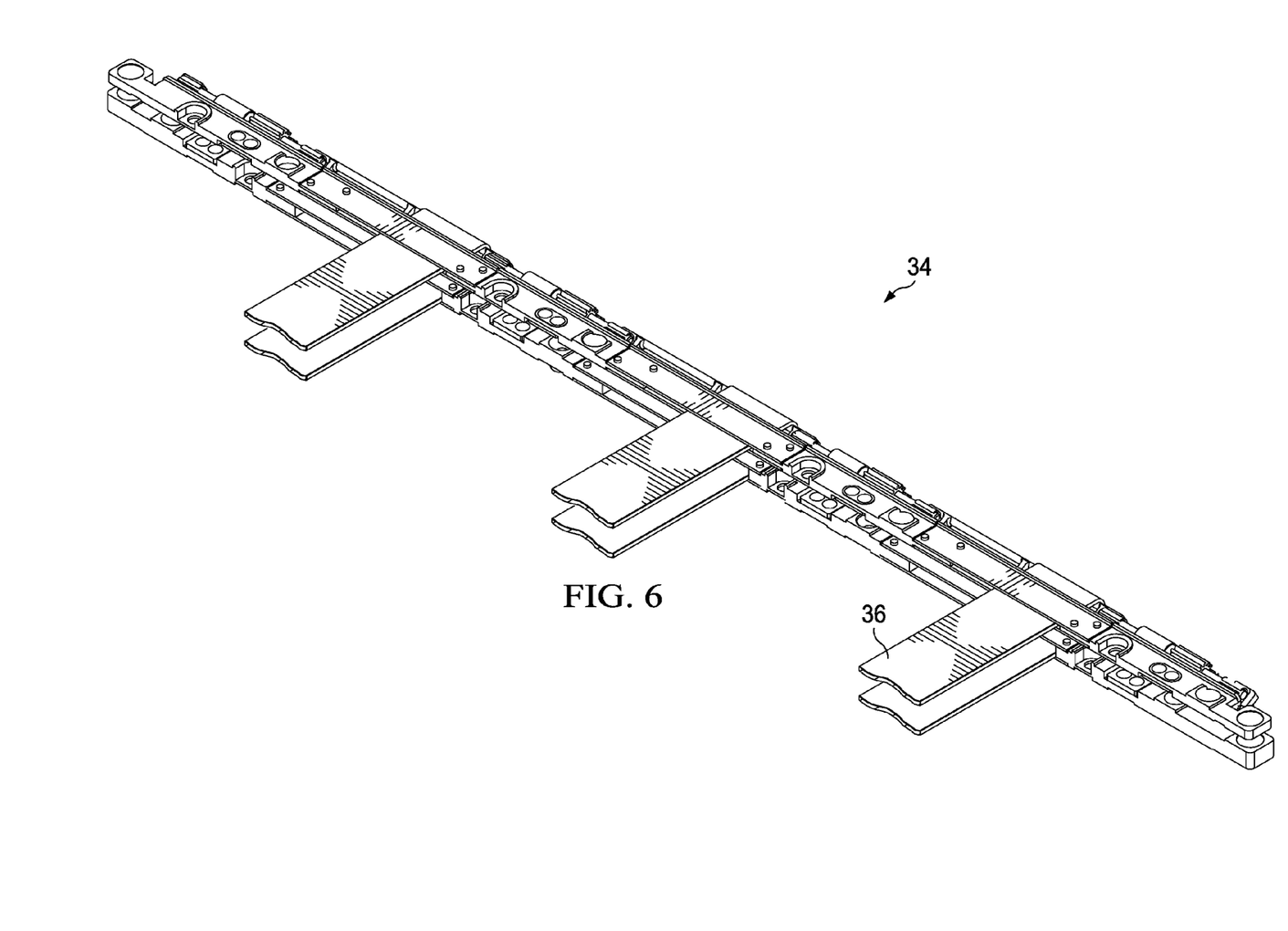
FIG. 6 depicts a side perspective view of the hinge assembly having cables extending therefrom.
Figure 7:
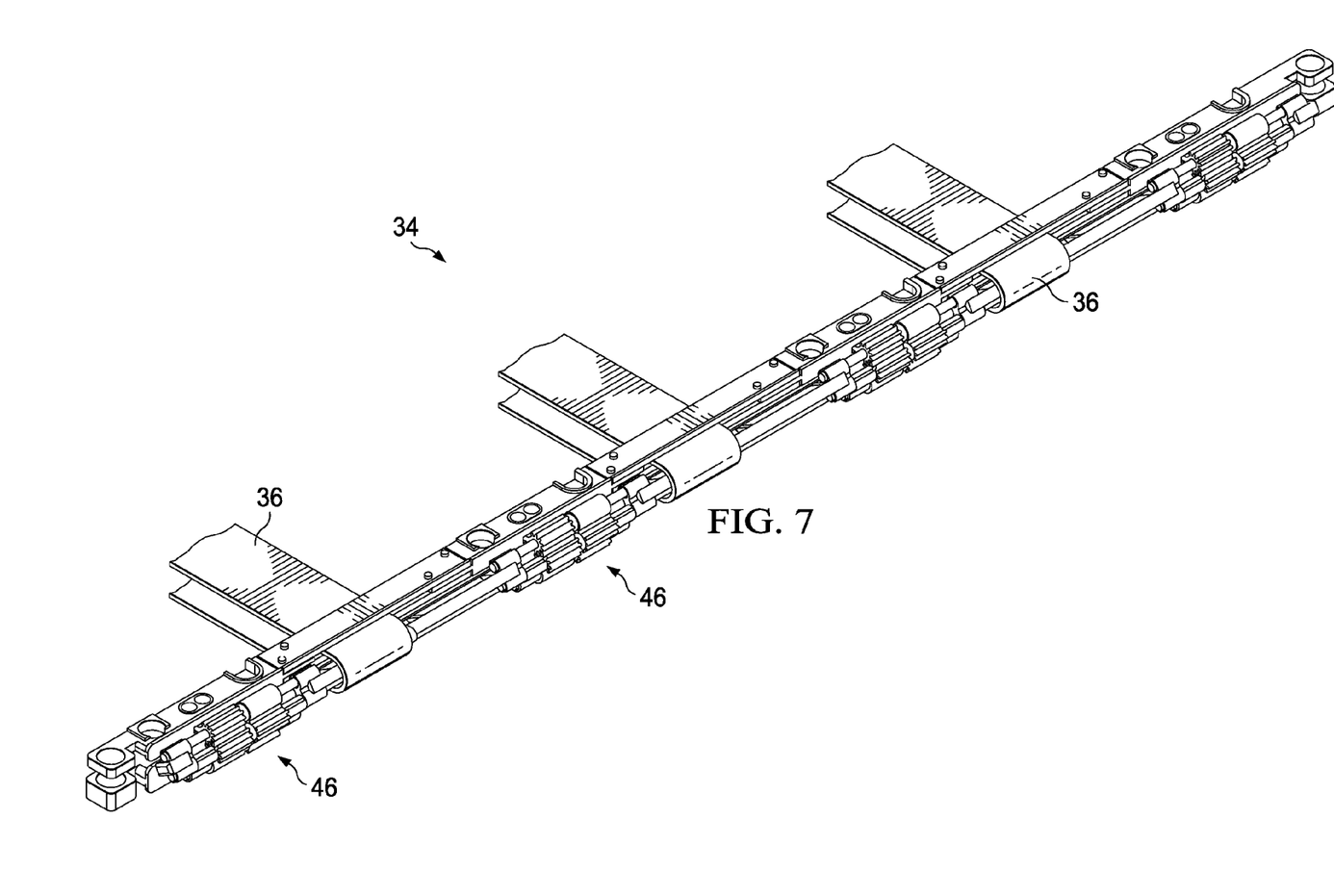
FIG. 7 depicts a side perspective view of the hinge assembly having cables disposed between hinges.

Referring now to FIG. 6, a side perspective view depicts the hinge assembly 34 having cables 36 extending therefrom. Advantageously, cables 36 may be integrated with hinge assembly during manufacture to that the connectors are exposed during assembly of information handling system components. FIG. 7 depicts a side perspective view of the hinge assembly 34 having cables 36 disposed between hinges 46. By inserting cables 36 between hinge elements 46 before coupling adhesive surface 48 between the hinge elements 46, more convenient integration of cables 36 is accomplished. In alternative embodiments, cables 36 may be inserted separately or individually as room provided between hinge elements permits.

Figure 8:
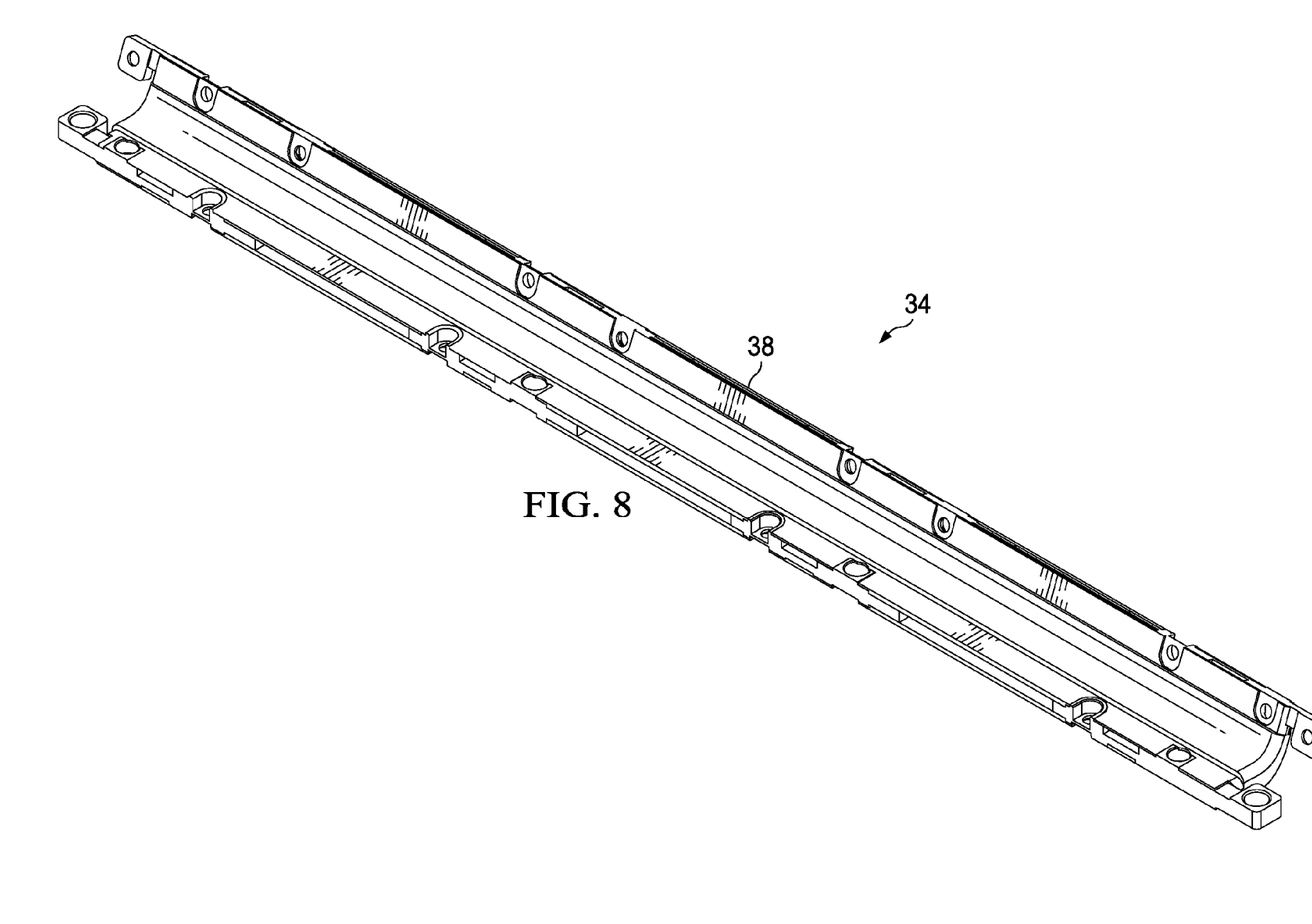
FIG. 8 depicts a side perspective view of the hinge assembly having a cover disposed over the cables.

Referring now to FIG. 8, a side perspective view depicts the hinge assembly 34 having a cover 38 disposed over the cables. Cover 38 is precut material that flexes with movement of hinge assembly 34 during rotation of housing portions. In various embodiments, cover 34 may be an elastic thermoplastic, rubber or other similar material, and may include a treated outer surface that provides a desired appearance, such as leather, textiles, braided leathers, elastic textiles or similar material. Cover 38 couples to hinge assembly 34 with an adhesive or mechanical attachment, such as stitching or screws. In the example embodiment, precut portions of cover 38 provide room for accepting coupling screws to couple with an information handling system housing. Cover 38 is held in place in part by trapping cover 38 within the mechanical arrangement that couples hinge assembly 34 to the information handling system, as set forth in greater detail below.

Figure 9:
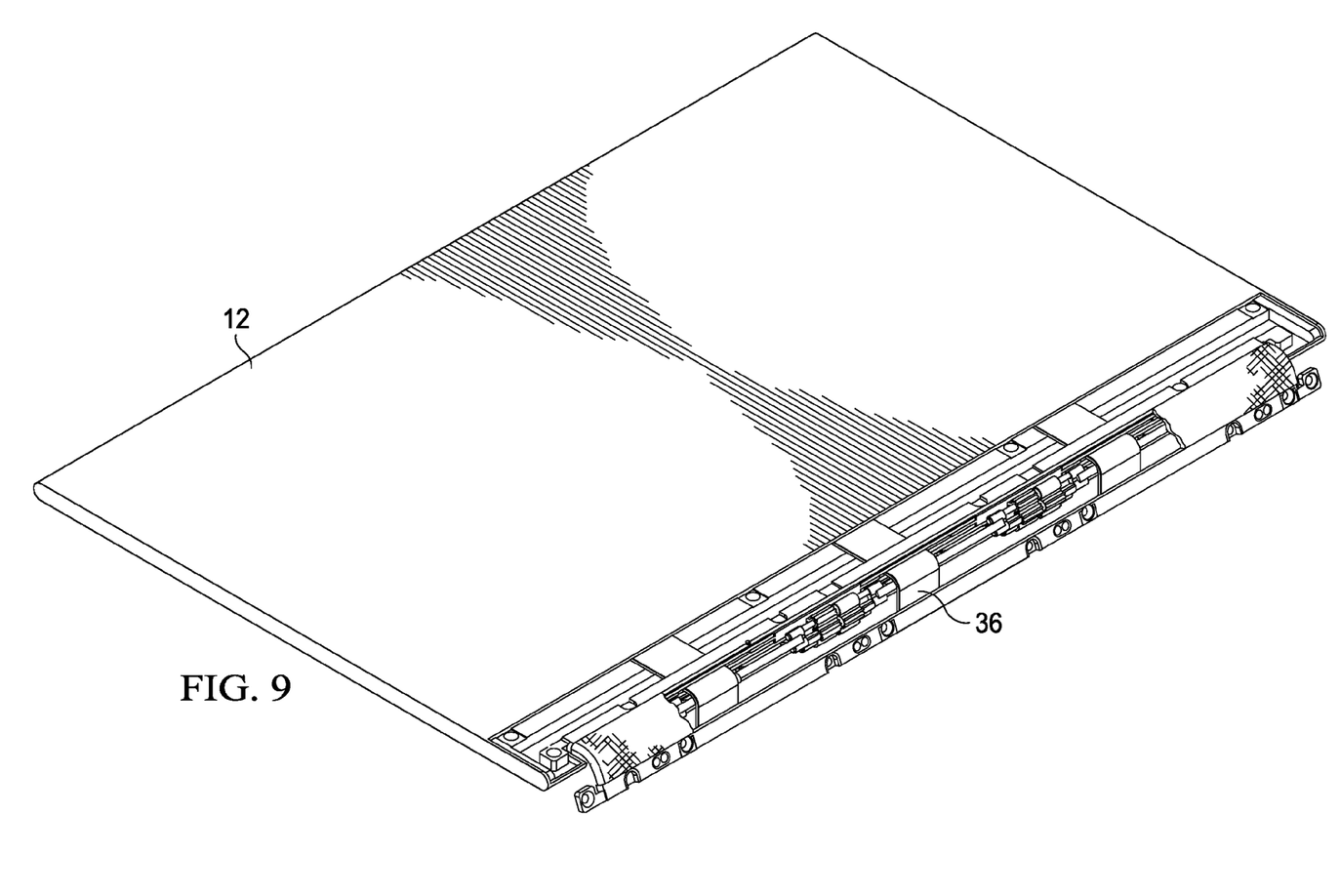
FIG. 9 depicts a bottom view of a main housing portion having the hinge assembly disposed for coupling with the cover in place.
Figure 10:
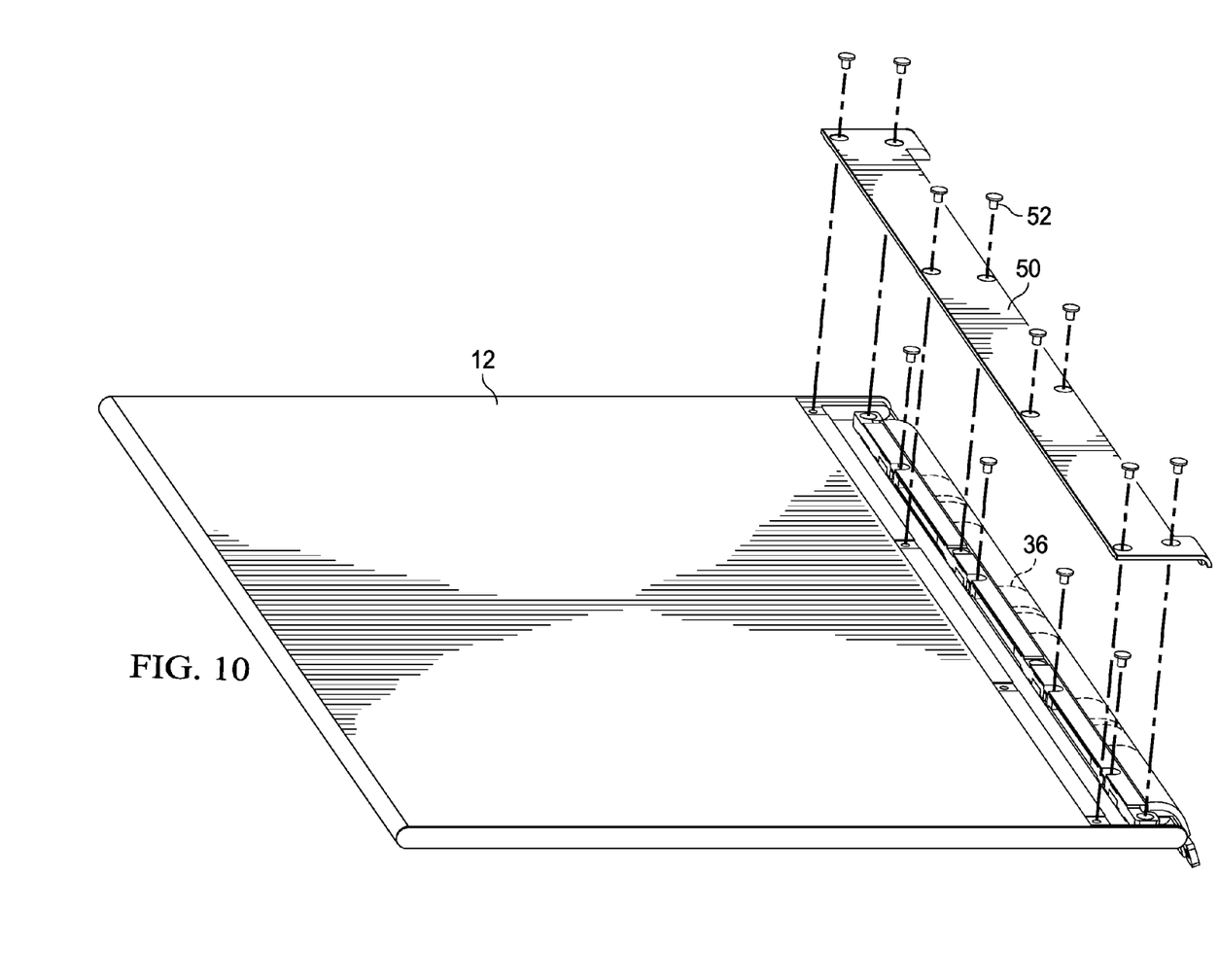
FIG. 10 depicts a bottom view of the main housing having a base cover aligned to couple the hinge assembly in place.

Referring now to FIG. 9, a bottom view depicts a main housing portion 12 having the hinge assembly 34 disposed for coupling with the cover 38 in place. Housing portion 12 includes a slot formed on the bottom base that couples hinge assembly 34 to an outside surface. The hinge coupling arrangement provides better access for assembly and moves the hinge coupling away from the hinge location. FIG. 10 depicts a bottom view of the main housing 12 having a base cover 50 aligned to couple the hinge assembly 34 in place. Base cover 50 is a stiff and robust material, such as metal or hardened plastic, that attaches with screws 52 that pass through hinge assembly 34 and engage main housing portion 12. Base cover 50 traps flexible cover 38 in place for secure attachment. Lid housing portion 14 couples to the opposite side of hinge assembly 34 in a similar manner.

Figure 11:
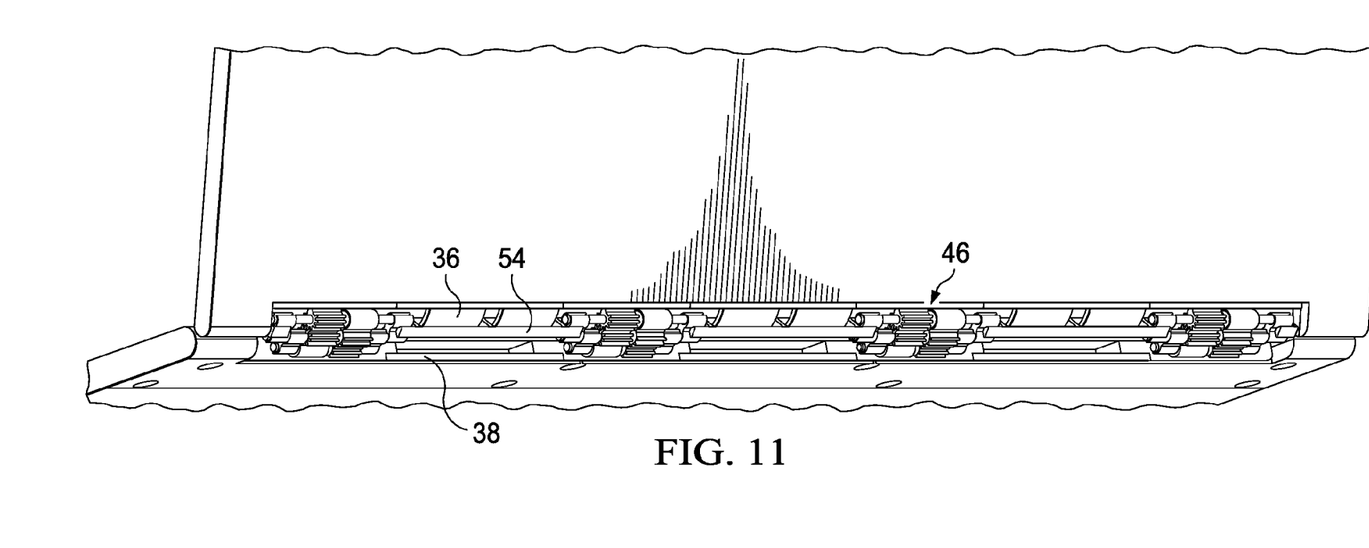
FIG. 11 depicts a rear side view of the hinge assembly and cables coupled between main and lid housing portions.

Referring now to FIG. 11, a rear side view depicts hinge assembly 34 and cables 36 coupled between main and lid housing portions 12 and 14. Cable 36 flex within the space provided between hinges 46 to provide freedom of movement of the housing portions coupled to hinge assembly 34. A hand support 54 is disposed between hinges 46 to restrain flexible cover 38 from pulling into hinge 46 gear structures and to provide support against end user grasps that press inward against cover 38. In the example embodiment, hinges 46 are evenly displaced across the length of hinge assembly 34 and cables 36 travel between each set of hinges 46. In alternative embodiments, hinges 46 may be disposed at irregular distances to make room for cables at particular locations of with additional spacing provided through at least some hinge 46 pairs. For example, the center two hinges 46 may have an increased spacing that provides more space so that cables may pass through. Alternatively, the placement of a hinge 46 may be shifted in a direction to make room for a cable 36 to pass through at the hinge 46 location.

Figure 12:
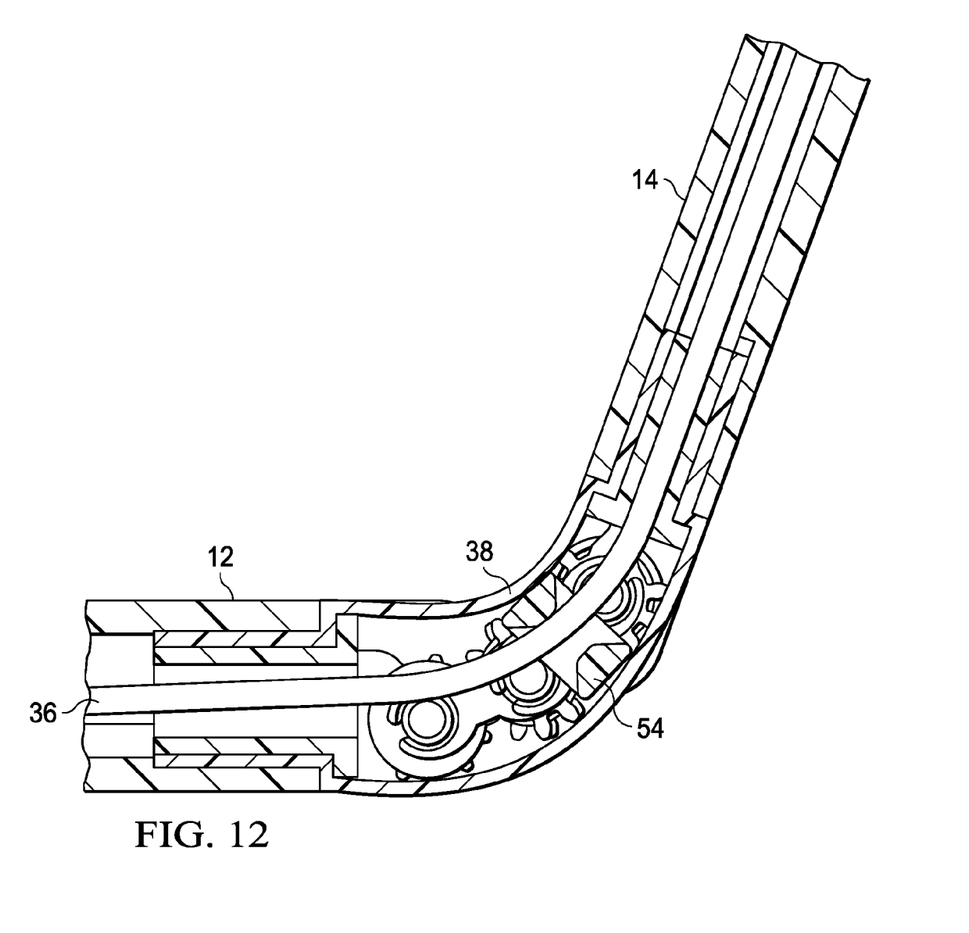
FIG. 12 depicts a side cutaway view of an assembled information handling system having cables protected by the elastic cover.

Referring now to FIG. 12 a side cutaway view depicts an assembled information handling system 10 having cables 36 protected by the elastic cover 38. In the example configuration, lid portion 14 is disposed in a raised position relative to base portion 12 so that an integrated display is held in a clamshell configuration for viewing by an end user. Cover 38 on the bottom surface of information handling system 10 is stretched by hinge rotation to the clamshell position while cover 38 on the upper surface of information handling system 10 is compressed by the same hinge rotation. Each cover 38 is coupled in place by a base 12 that captures cover 38 and hinge assembly 34 against main housing portion 12 and lid housing portion 14. Cables 36 extend through hinge assembly 34 in a central location to avoid excessing stretching or compressing forces. In one embodiment, cable 36 has a flexible material that aids in adapting to rotational movement. A hand support 54 guides and protects cables 36 through the area of hinge rotation. Since the open area between main housing portion 12 and lid housing portion 14 that is populated by hinge assembly 34 is covered only by flexible cover 38, the size and distribution of hinge assembly 34 hinges 46 can focus on functional movement free from adapting to obstructions related to hardened housing movements.

Although the present invention has been described in detail, it should be understood that various changes, substitutions and alterations can be made hereto without departing from the spirit and scope of the invention as defined by the appended claims.

What is claimed is:
1. A portable information handling system comprising:
a housing having first and second portions;
a processor disposed in the first housing portion and operable to execute instructions to process information;

a memory disposed in the first housing portion and interfaced with the processor, the memory operable to store the information;

a display disposed in the second housing portion and interfaced with the processor and memory, the display operable to present the information as visual images;

a hinge assembly coupled to the first and second housing portions and operable to rotate the first and second housing portions relative to each other; and a flexible cover coupled to the first and second housing portions over the hinge assembly, the flexible cover stretching and compressing responsive to rotation of the first and second housing portions relative to each other;

wherein the flexible cover comprises an elastic thermoplastic having raised portions extending outward, the raised portions separating during the stretching and moving together during the compressing.

2. The portable information handling system of claim 1 further comprising a decorative material coupled to the elastic thermoplastic.

3. The portable information handling system of claim 1 further comprising:

a chipset having graphics processing disposed in the first housing portion;

a timing controller disposed in the second housing portion; and one or more cables interfacing the display and the chipset to communicate graphics information for the graphics processing to the timing controller, the cables running through the hinge assembly.

4. The portable information handling system of claim 3 wherein the hinge assembly comprises plural hinges and the cables run between first and second of the plural hinges.

5. The portable information handling system of claim 4 wherein the plural hinges are disposed with at irregular spacing intervals.

6. The portable information handling system of claim 1 further comprising a base cover disposed to couple to the housing portion to capture the hinge assembly.

7. A portable information handling system comprising:

a housing having first and second portions;

a processor disposed in the first housing portion and operable to execute instructions to process information;

a memory disposed in the first housing portion and interfaced with the processor, the memory operable to store the information;

a display disposed in the second housing portion and interfaced with the processor and memory, the display operable to present the information as visual images;

a hinge assembly coupled to the first and second housing portions and operable to rotate the first and second housing portions relative to each other;

a flexible cover coupled to the first and second housing portions over the hinge assembly, the flexible cover stretching and compressing responsive to rotation of the first and second housing portions relative to each other; and a base cover disposed to couple to the housing portion to capture the hinge assembly.

8. The portable information handling system of claim 7 wherein the flexible cover comprises an elastic thermoplastic.

9. The portable information handling system of claim 8 further comprising a decorative material coupled to the elastic thermoplastic.

10. The portable information handling system of claim 8 wherein the elastic thermoplastic comprises raised portions extending outward, the raised portions separating during the stretching and moving together during the compressing.

11. The portable information handling system of claim 7 further comprising:

a chipset having graphics processing disposed in the first housing portion;

a timing controller disposed in the second housing portion; and one or more cables interfacing the display and the chipset to communicate graphics information for the graphics processing to the timing controller, the cables running through the hinge assembly.

12. The portable information handling system of claim 11 wherein the hinge assembly comprises plural hinges and the cables run between first and second of the plural hinges.

13. The portable information handling system of claim 12 wherein the plural hinges are disposed with at irregular spacing intervals.

* * * * *